US009941620B2

(12) United States Patent
Bouda et al.

(10) Patent No.: US 9,941,620 B2
(45) Date of Patent: Apr. 10, 2018

(54) HOUSING FOR AN ELECTRICAL CONNECTOR

(71) Applicant: TE Connectivity Germany GmbH, Bensheim (DE)

(72) Inventors: Harald Bouda, Haibach (DE); Hartmut Ripper, Darmstadt (DE)

(73) Assignee: TE Connectivity Germany GmbH, Bensheim (DE)

(*) Notice: Subject to any disclaimer, the term of this patent is extended or adjusted under 35 U.S.C. 154(b) by 0 days.

(21) Appl. No.: 15/018,079

(22) Filed: Feb. 8, 2016

(65) Prior Publication Data

US 2016/0156122 A1 Jun. 2, 2016

Related U.S. Application Data

(63) Continuation of application No. PCT/EP2014/067111, filed on Aug. 8, 2014.

(30) Foreign Application Priority Data

Aug. 9, 2013 (DE) ........................ 10 2013 215 787

(51) Int. Cl.

*H02B 1/00* (2006.01)
*H01R 13/514* (2006.01)
*H01R 13/506* (2006.01)
*H01R 13/627* (2006.01)

(52) U.S. Cl.

CPC ......... *H01R 13/514* (2013.01); *H01R 13/506* (2013.01); *H01R 13/6271* (2013.01)

(58) Field of Classification Search

CPC .. H01R 13/514; H01R 13/506; H01R 13/518; H01R 13/6275; H01R 13/6273; H01R 13/6272

USPC ......................................... 439/701, 357, 353

See application file for complete search history.

(56) References Cited

U.S. PATENT DOCUMENTS 3,184,707 A 5/1965 Anderson
5,688,148 A * 11/1997 Hatagishi ............. H01R 13/447 439/395
5,731,545 A * 3/1998 Reed ...................... H02G 3/088 174/66
6,010,373 A * 1/2000 Donahue .............. H01R 13/514 439/680
6,183,309 B1 * 2/2001 Chiang .................. H01R 4/185 439/687
6,196,882 B1 * 3/2001 Sato ..................... H01R 9/2408 174/50
6,382,989 B1 * 5/2002 Yu ...................... H01R 13/4361 439/686
7,004,791 B2 * 2/2006 Mumper ................ H01R 43/18 439/595
7,214,080 B2 * 5/2007 Ichio .................. H01R 13/6315 439/246

(Continued)

OTHER PUBLICATIONS

International Search Report and Written Opinion, Intl Application No. PCT/EP2014/067111, dated Oct. 20, 2014, 7 pages.

*Primary Examiner* — Hien Vu
(74) *Attorney, Agent, or Firm* — Barley Snyder

(57) ABSTRACT

A housing for an electrical connector is disclosed. The housing has a base member and at least one wall element produced from a more wear-resistant material than the base member and including a positive-locking element. The wall element is connected to the base member.

15 Claims, 6 Drawing Sheets

(56) References Cited

U.S. PATENT DOCUMENTS

| | | | | |
|---|---|---|---|---|
| 7,524,215 | B2 * | 4/2009 | Banas .................. | H01R 13/506 439/465 |
| 7,799,991 | B1 * | 9/2010 | Advey ................. | H01R 13/424 174/50 |
| 8,043,127 | B2 * | 10/2011 | Bailey .................. | H01R 13/514 439/701 |
| 2005/0287873 | A1 | 12/2005 | Carroll et al. | |
| 2010/0144206 | A1 | 6/2010 | Pfaffenbach et al. | |

* cited by examiner

HOUSING FOR AN ELECTRICAL CONNECTOR

CROSS-REFERENCE TO RELATED APPLICATIONS

This application is a continuation of PCT International Application No. PCT/EP2014/067111, filed Aug. 8, 2014, which claims priority under 35 U.S.C. § 119 to German Application No. 102013215787.8, filed Aug. 9, 2013.

FIELD OF THE INVENTION

The present invention relates to a housing for an electrical connector, and more particularly, to a housing with a positive-locking element for connection to a mating connector.

BACKGROUND

When connectors are connected to mating connectors, positive-locking elements are often used to produce the mechanical connection between the connector and the mating connector. For example, teeth or recesses on the connector may be used for connection with corresponding teeth on the mating connector. Such positive-locking elements are in most cases subjected to high levels of mechanical loading. The housings are thus produced from a mechanically loadable and consequently comparatively expensive material whose processing is frequently more complex than the processing of other materials.

SUMMARY

An object of the invention, among others, is to provide an electrical connector which is less costly than previous connectors while retaining durability. The disclosed housing for an electrical connector has a base member and at least one wall element produced from a more wear-resistant material than the base member and including a positive-locking element. The wall element is connected to the base member.

BRIEF DESCRIPTION OF THE DRAWINGS

The invention will now be described by way of example with reference to the accompanying figures, of which.

DETAILED DESCRIPTION OF EMBODIMENT(S)

The invention is explained in greater detail below with reference to embodiments of a housing for an electrical connector. This invention may, however, be embodied in many different forms and should not be construed as limited to the embodiments set forth herein; rather, these embodiments are provided so that this disclosure will be thorough and complete and still fully convey the scope of the invention to those skilled in the art.

Figure 1:
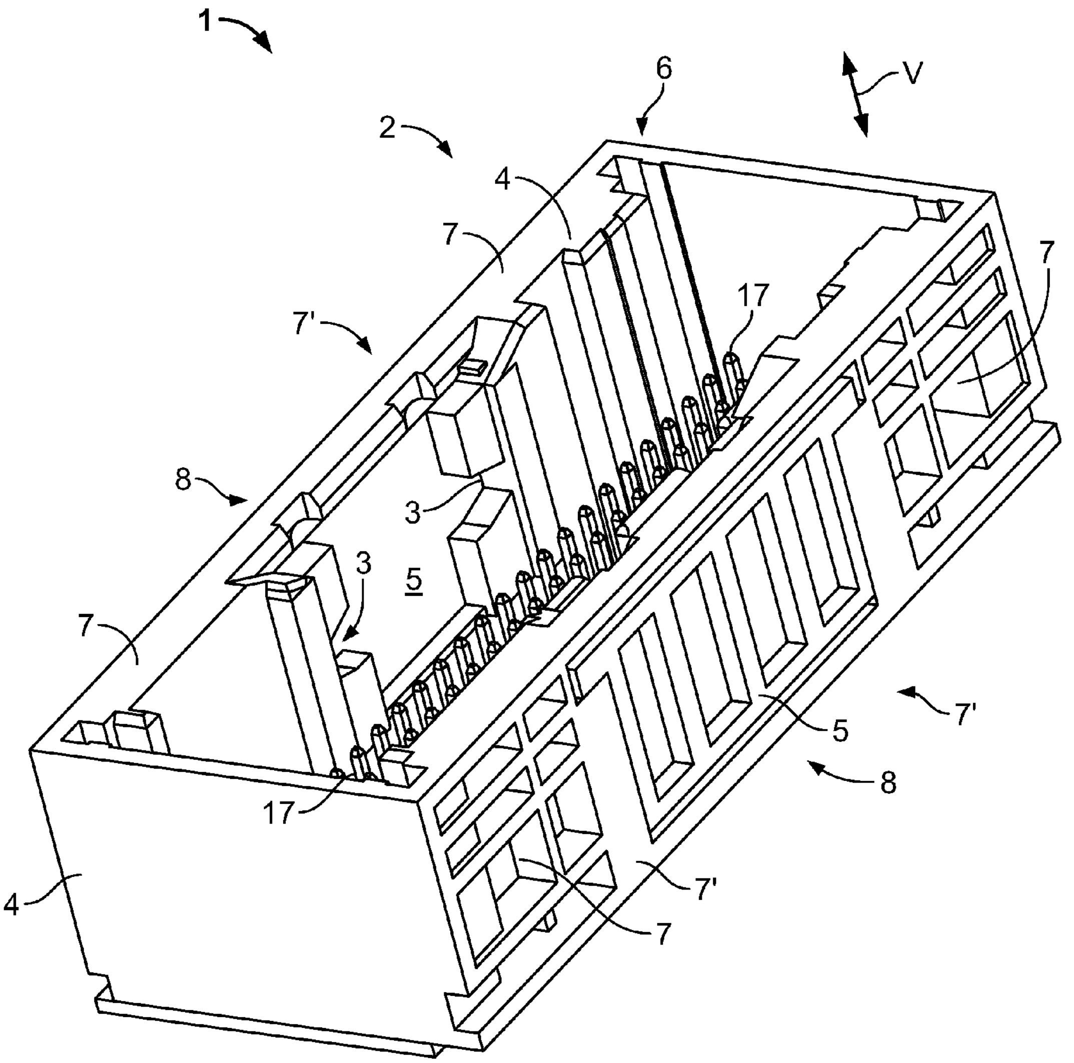
FIG. 1 is a perspective view of a first embodiment of a housing according to the invention.

FIG. 1 shows a housing 1 according to the invention for an electrical connector 2. The housing 1 comprises a base member 4 and wall elements 5. The major components of the invention will now be described in greater detail.

Figure 2:
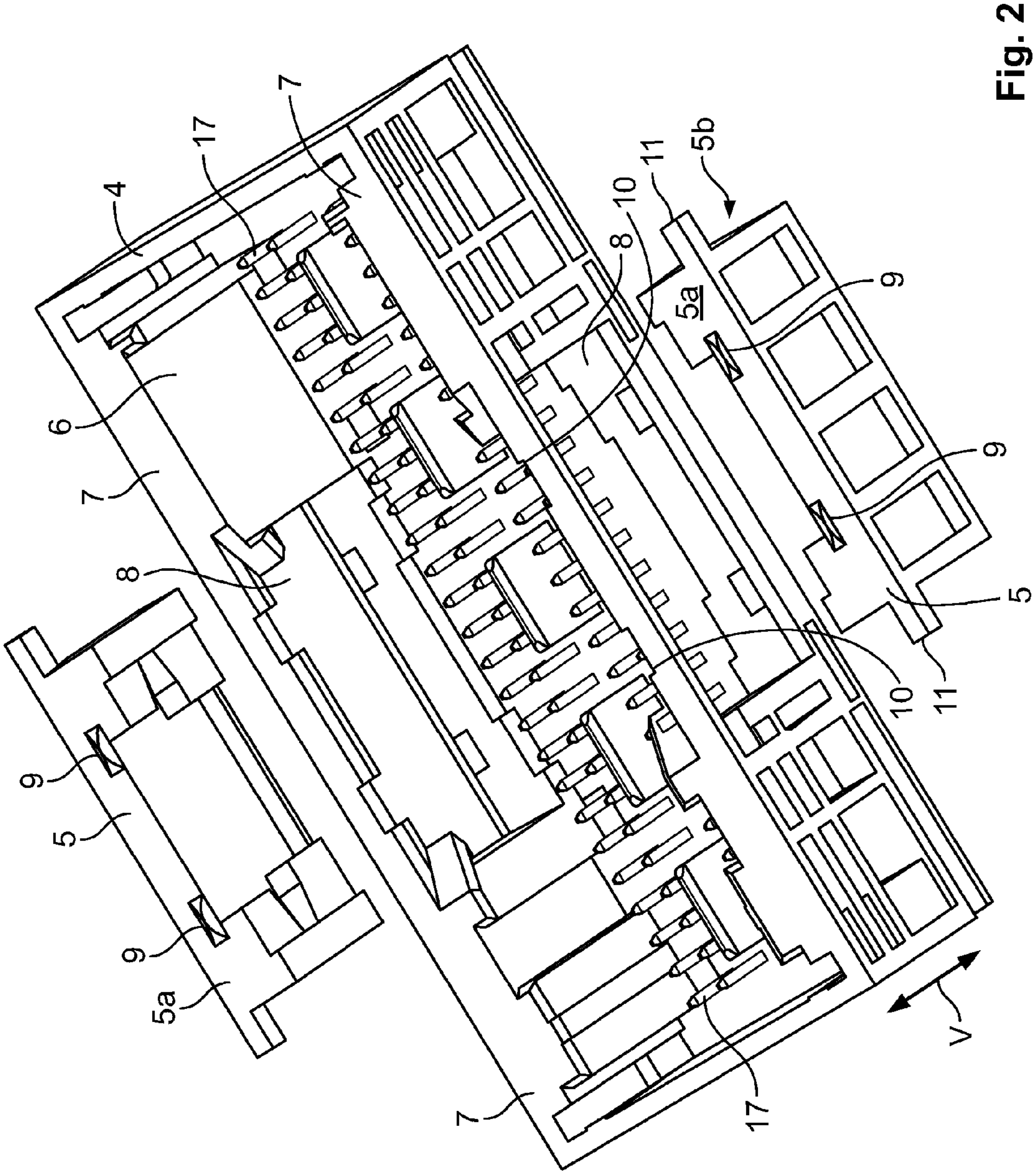
FIG. 2 is a partially exploded perspective view of the first embodiment of the housing according to the invention from FIG. 1.
Figure 3:
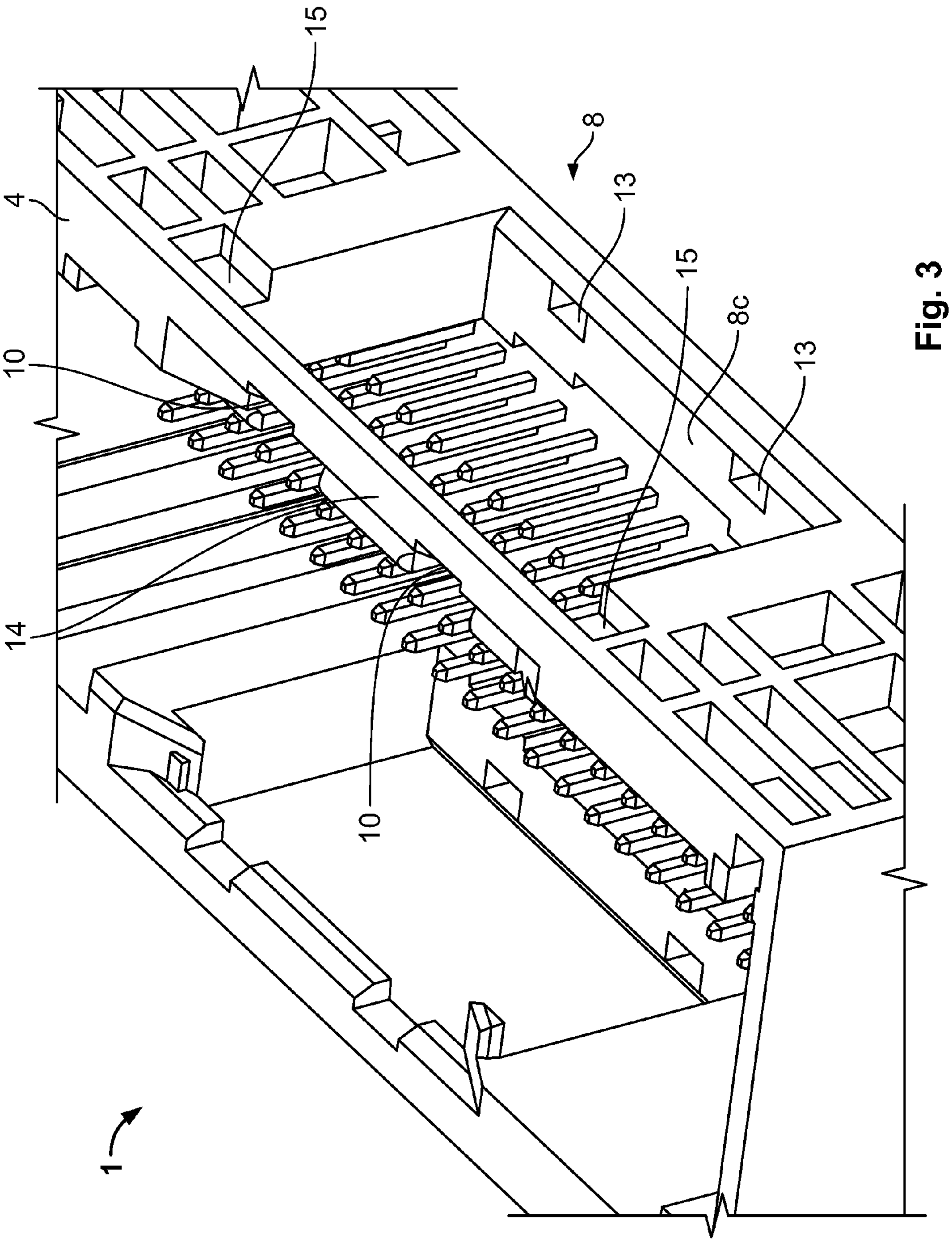
FIG. 3 is a perspective view of a detail of the base member of the housing from FIGS. 1 and 2.
Figure 4:
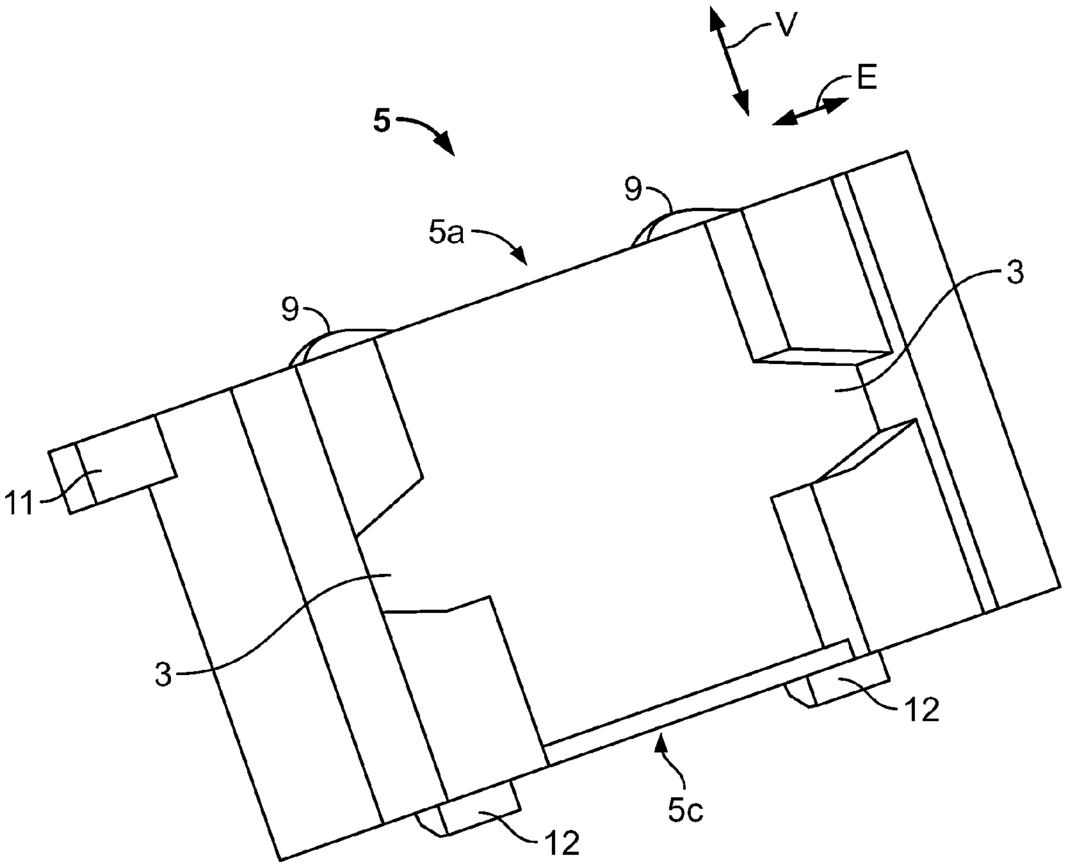
FIG. 4 is a perspective view of a wall element of the housing from FIGS. 1 to 3.
Figure 5:
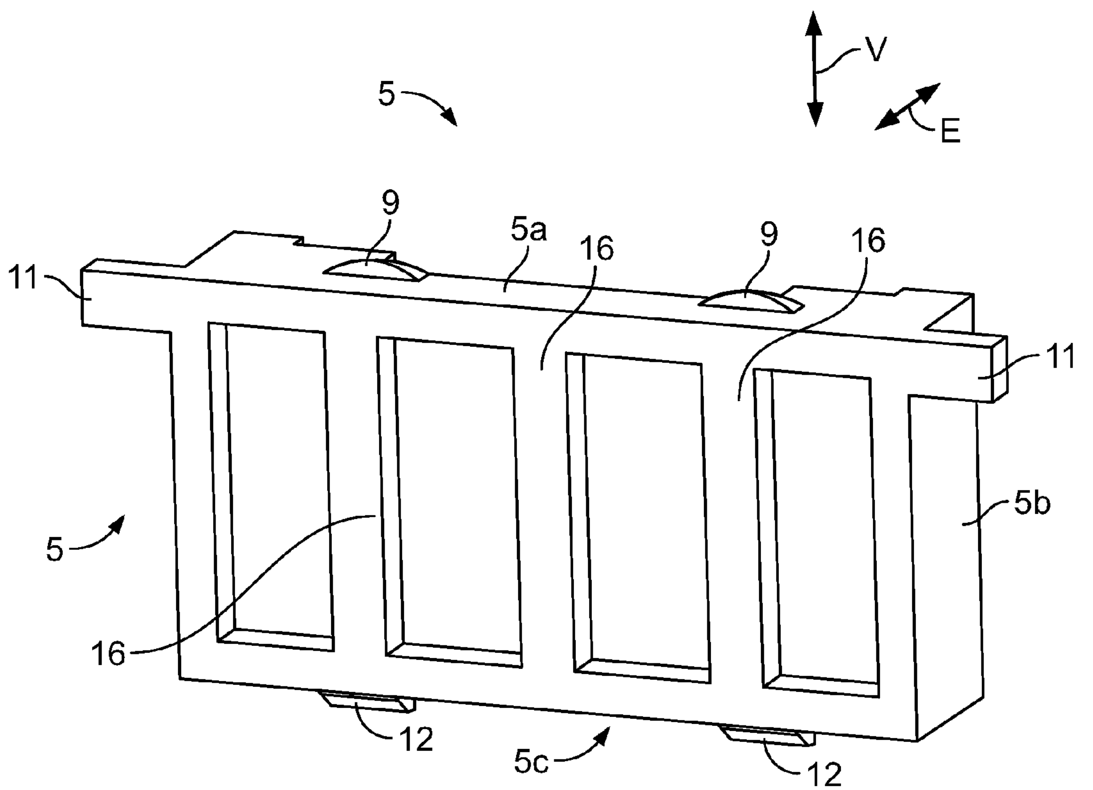
FIG. 5 is another perspective view of the wall element from FIG. 4 from a different perspective.

The wall elements 5 will now be described with reference to FIGS. 1-5. As shown in FIG. 1, the wall elements 5 have positive-locking elements 3. Positive-locking element 3 is a recess into which a tooth of a connection mechanism (not shown) can be introduced, which tooth is fitted to a lever. As shown in FIG. 2, wall elements 5 also have catch elements 9, which are projections which protrude from the upper sides 5*a* of the wall elements 5. Lateral projections 11 protrude from lateral faces 5*b* of the wall elements 5, while positioning elements 12 protrude from lower sides 5*c*, as shown in FIG. 4. Additionally, reinforcement struts 16 may reinforce the wall element 5, as shown in FIG. 5.

Plastics materials, in particular thermoplastic plastics materials, can be used as the material for the wall element 5. The material of the wall element 5 may contain glass fibers in any proportions. Optionally, the glass fibers may constitute 30% of the material of the wall element 5. The glass fibers provide the wall element 5 a high degree of hardness and a high tensile strength.

The base member 4 will now be described with reference to FIGS. 1-3. In the embodiment illustrated in FIG. 1, the base member 4 forms a receiving member 6 having side walls 7. As best shown in FIG. 2, the side walls 7 have apertures 8. Counter-positioning elements 13 are recesses formed in the lower side 8*c* of the aperture 8, while bridge element 14 forms the upper side 8*a* of the aperture 8. Counter-stop faces 15 are indentations formed on the outside of the base member, one end of which intersects the aperture 8. Counter-catch elements 10 on the inside of the bridge elements 14 are formed by recesses, as shown in FIGS. 2 and 3.

Plastics materials, in particular thermoplastic plastics materials, can also be used as the material for the base member 4. The base member 4 and the wall element 5 may comprise different plastics materials. For example, the base member 4 may be produced from a cost-effective plastics material which is simple to process and which is less wear-resistant than the plastics material of the wall element 5. The material of the base member 4 may not contain any glass fibers. The production of the base member 4 is thereby simple since materials which contain glass fibers are more difficult to process than materials which contain no glass fibers.

The connector 2 shown in FIG. 1 further has, in addition to the housing 1, contact elements 17 which are used to connect to counter-contact elements on a mating connector.

a. The connections of the housing 1 comprising the base member 4 and wall elements 5 will now be described.

In FIG. 2, the housing 1 is shown in a partially exploded view which corresponds to a preassembly position. The wall elements 5 are not yet fitted to the base member 4. They are subsequently inserted into the apertures 8 of the side walls 7 of the base member 4.

The wall elements 5 are inserted into the base member 4 in the following manner. The lower side 5*c* of a wall element 5 is placed on a lower side 8*c* of the aperture 8 so that the positioning elements 12 engage in the counter-positioning elements 13. Positioning elements 12 interact with counter-positioning elements 13 to enable positioning of the wall elements 5 relative to the base member 4, and limit the movability of the wall elements 5 relative to the base member 4 in two directions; the direction oriented out of the base member 4 and the direction in which the side walls 7 extend. The wall element 5 is then tilted about the positioning elements 12 so that the catch elements 9 are in abutment with a bridge element 14 at the upper side 8*a* of the aperture 8. The wall element 5 is pressed at the upper end thereof further in the direction of the inner side of the housing 1 so that the bridge element 14 is resiliently deflected in the region of the counter-catch elements 10 and the catch elements 9 can slide below the bridge element 14.

Subsequently, the catch elements 9 engage in the counter-catch elements 10 and the bridge element 14 relaxes again. The engagement of the catch elements 9 with the counter-catch elements 10 prevent the wall elements 5 from falling outwards out of the base member 4. The lateral projections 11 in this instance strike counter-stop faces 15 so that the wall element 5 is prevented from falling inside the housing 1. The lateral projections 11 simultaneously ensure the positive-locking connection between the wall elements 5 and the base member 4 in the connection direction V. They thus prevent the wall elements 5 from being displaced in the connection direction V when the connector 2 is joined to the mating connector. Thus, in the assembled state, the catch elements 9, the positioning elements 12, and the lateral projections 11 each have catch and positioning functions.

The wall elements 5 form, together with the side walls 7 of the base member 4, continuous side walls 7' which protect the inner side of the housing 1.

The wall element 5 and base member 4 may be produced form injection moulding. In particular with injection-moulded components, there is increased production complexity when the components which are intended to be produced have undercut portions. In an embodiment, owing to the modular construction of the housing according to the invention, the wall element and/or the base member may be constructed so as not to have any undercut portions. The individual elements may each be removed from an injection-moulding mould in a separate demoulding direction, the removal directions of the individual elements corresponding to different directions on the assembled housing. Owing to the assembly, it is thus possible to produce from elements which do not have undercut portions structures which correspond to an undercut in a one-piece housing. Thus, the wall element 5, for instance, may be inserted transversely relative to a demoulding direction of the base member 4 and in this instance form positive-locking elements 3 of the housing which act in the removal direction of the base member 4.

As can be seen in FIG. 4, the wall element 5 has no undercut portions. It can be removed from an injection-moulding mould in a removal direction E which extends perpendicularly to the connection direction V. A positive-locking connection is thus possible in the connection direction V.

The wall element 5 is inserted into the base member 4 in a direction which corresponds to the removal direction E. A positive-locking connection is thereby possible in the connection direction V, although the wall element 5 itself has no undercut portions.

The embodiment shown here enables the wall elements 5 to be repeatedly inserted into and removed from the base member 4. In another embodiment, the wall elements 5 and the base member 4 could be constructed in such a manner that they can no longer be released from each other without being destroyed after the connection operation.

The housing 1 may be connected to a mating connector (not shown) via positive-locking elements 3. The tooth of a connection mechanism of the mating connector can be introduced into the positive-locking element 3. The connector 2 can thereby be pressed onto the mating connector or pressed away from it.

In other embodiments according to the invention, a single wall element 5 or a single set of wall elements 5 and differently constructed base members 4 may be provided. In addition to the base member 4 illustrated in FIGS. 1 and 2, for example, it is further possible for additional base members 4 having a smaller or larger number of contact elements 17 to be provided, corresponding to a smaller or lager base member 4. On the side walls 7 of such base members 4, there may be provided same-sized apertures 8 which are constructed in a similar manner to the apertures of the base member 4 illustrated in FIGS. 1 and 2. The wall elements 5 from FIGS. 1, 2, 4 and 5 may thus be inserted into each of these base members 4 and together therewith form a housing 1. Thus, the same wall elements 5 can be produced for base members 4 in a range of different sizes.

Figure 6:
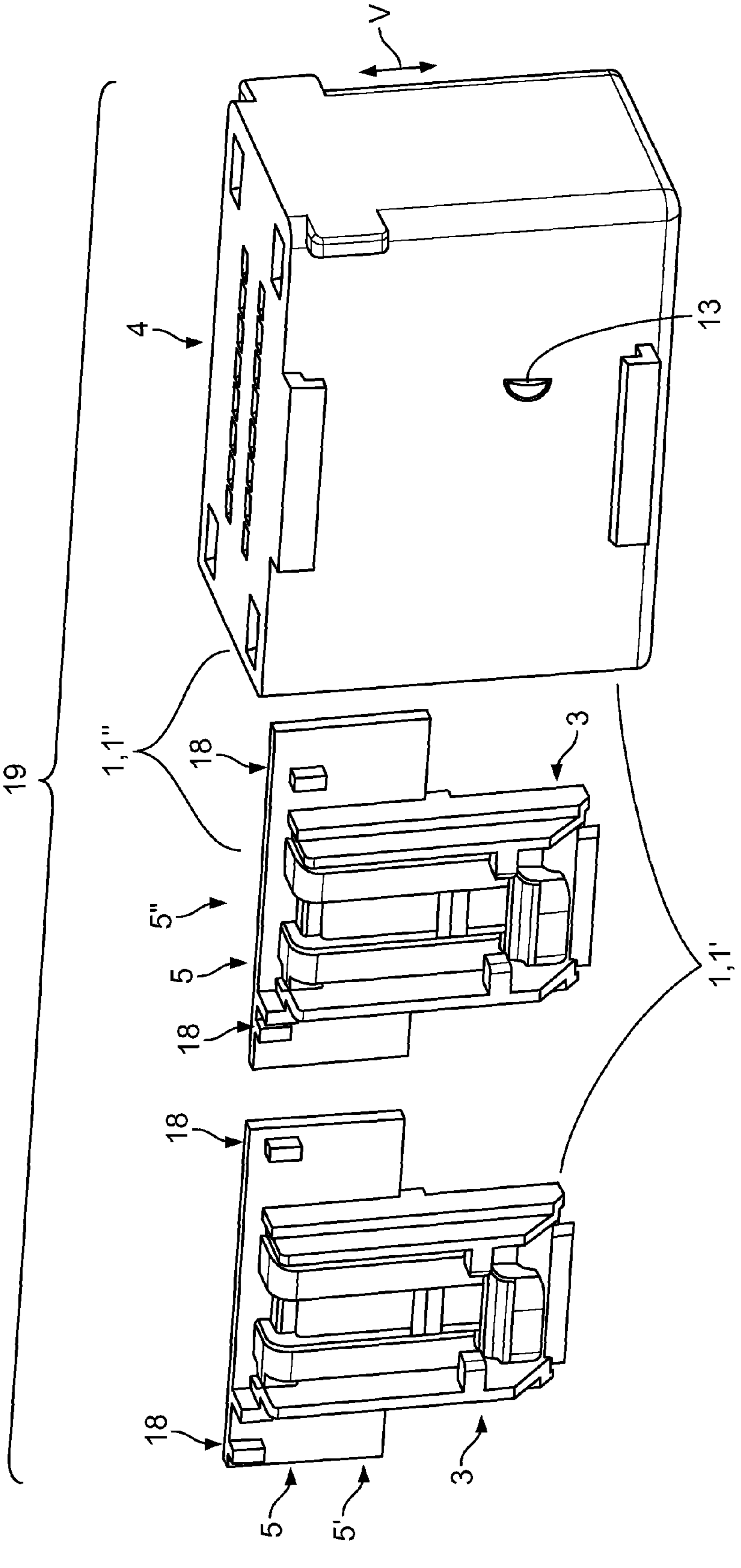
FIG. 6 is a perspective view of a construction kit according to the invention.

FIG. 6 shows a construction kit 19 which is constructed differently. This has a single base member 4 which can be connected in a positive-locking manner to a plurality of wall elements 5. The two wall elements 5 shown here have differently constructed encoding elements 18 so that they are compatible only with specific mating connectors. Depending on the mating connector to which the connector 2 is intended to be connected, the base member 4 can be assembled with the corresponding wall element 5. If it is assembled with the first wall element 5' illustrated on the left, a first variant 1' of a housing 1 is produced. If the base member 4 is assembled with the second wall element 5" illustrated in the center, a second variant 1" of a housing 1 is produced. In contrast to the previous situation, it is no longer necessary to produce the entire housing 1. Instead, it is now possible to produce only corresponding wall elements 5 with positive-locking elements 3 and to combine them with a base member 4 which is compatible with all of the wall elements 5 of a construction kit 19. In this instance, the base member 4 may again comprise a more cost-effective material which is easier to process since the mechanical loading occurs only in the region of the positive-locking elements 3 of the wall elements 5. It is sufficient to produce the wall elements 5 from a stable material. As in the first embodiment from FIGS. 1 to 5, the elements of the second embodiment from FIG. 6 are again injection-moulded components.

Advantageously, the wall element 5 may be able to be connected to the base member 4 so as to be able to be repeatedly released. It can thus not only be connected to the base member 4 but also released therefrom again. Simple replacement of the wall element 5 and/or the base member 4 is thereby possible. Replacement of the entire connector can be dispensed with.

In a further advantage, by containing glass fibers, the wall elements 5 comprise a more wear-resistant material than the base member 4. Owing to the glass fiber proportion, the material of the wall element 5 may have a higher degree of hardness than the material of the base member 4. A locally high force, together with mostly hard edges, as occur, for example, in the region of the positive-locking elements 3 when the connector 2 is connected to the mating connector in the connection direction V, therefore brings about hardly any deformations or damage. The glass fiber proportion also leads to the material of the wall element 5 having a higher tensile strength than the material of the base member 4. Therefore, the wall element 5 is hardly deformed even at higher forces. Consequently, the positive-locking elements 3 may therefore have the necessary wear-resistance when the connector 2 is connected to the mating connector. At the same time, the production of the base member 4 from a less wear-resistant and consequently generally more cost-effective material ensures low expenditure for the connector 2.

In a further advantage, since the same wall elements 5 can be produced for base members 4 in a range of different sizes, material complexity with such a construction kit is lower than when differently constructed housings 1 are each produced in one piece. In particular, the base members 4 may be produced from a less wear-resistant material than housings 1 which are constructed in one piece.

What is claimed is:

1. A housing for an electrical connector, comprising:

a base member forming a receiving member having side walls, at least one side wall having an aperture; and at least one wall element produced from a more wear-resistant material than the base member and having a positive-locking element, the wall element connected to the base member in the aperture from an outer side of the base member in a positive-locking manner such that the base member and wall element together form a continuous side wall of the housing, the wall element having a catch element connecting with a counter-catch element of the base member and at least one of the catch element and the counter-catch element are resiliently deformable.

2. The housing for an electrical connector of claim 1 wherein the wall element is removably connected to the base member.

3. The housing for an electrical connector of claim 1 wherein the material of the wall element has a greater hardness than the material of the base member.

4. The housing for an electrical connector of claim 3, wherein the material of the wall element has a higher tensile strength than the material of the base member.

5. The housing for an electrical connector of claim 4, wherein the material of the wall element contains glass fibers.

6. The housing for an electrical connector of claim 1 wherein the wall element has a positioning element aligning the wall element with the aperture.

7. The housing for an electrical connector of claim 1, wherein at least one of the wall element and the base member are injection-moulded components.

8. A connector, comprising:

a housing for an electrical connector having a base member forming a receiving member having side walls, at least one side wall having an aperture, and at least one wall element produced from a more wear-resistant material than the base member and including a positive-locking element, the at least one wall element connected to the base member in the aperture from an outer side of the base member in a positive-locking manner such that the base member and wall element together form a continuous side wall of the housing, the wall element having a catch element connecting with a counter-catch element of the base member and at least one of the catch element and the counter-catch element are resiliently deformable.

9. The connector of claim 8, further comprising a contact element disposed in the housing.

10. The connector of claim 8, wherein the wall element is removably connected to the base member.

11. The connector of claim 8, wherein the material of the wall element has a greater hardness than the material of the base member.

12. The connector of claim 11, wherein the material of the wall element has a higher tensile strength than the material of the base member.

13. The connector of claim 12, wherein the material of the wall element contains glass fibers.

14. The connector of claim 8, wherein the wall element has a positioning element aligning the wall element with the aperture.

15. The connector of claim 8, wherein at least one of the wall element and the base member are injection-moulded components.

* * * * *